United States Patent
Westin et al.

(10) Patent No.: US 12,147,745 B2
(45) Date of Patent: Nov. 19, 2024

(54) ENGINEERING ANALYSIS OF A STRUCTURAL PRODUCT

(71) Applicant: The Boeing Company, Chicago, IL (US)

(72) Inventors: Benjamin A. Westin, Charleston, SC (US); Thaddeus L. Wells, Ladson, SC (US); Thomas Duffy Mitchum, Jr., North Charleston, SC (US); Robert Thomas Sheldon, Ladson, SC (US)

(73) Assignee: THE BOEING COMPANY, Arlington, VA (US)

( * ) Notice: Subject to any disclaimer, the term of this patent is extended or adjusted under 35 U.S.C. 154(b) by 1449 days.

(21) Appl. No.: 16/141,132

(22) Filed: Sep. 25, 2018

(65) Prior Publication Data

US 2020/0097624 A1   Mar. 26, 2020

(51) Int. Cl.
*G06F 30/23* (2020.01)
*G06F 111/20* (2020.01)

(52) U.S. Cl.
CPC .......... *G06F 30/23* (2020.01); *G06F 2111/20* (2020.01)

(58) Field of Classification Search
CPC .. G06F 30/23; G06F 2111/20; G06F 2119/02; G06F 30/15
See application file for complete search history.

(56) References Cited

U.S. PATENT DOCUMENTS

| | | | | |
|---|---|---|---|---|
| 2003/0192020 A1* | 10/2003 | Collins, Jr. | ......... | G06F 30/3312 716/136 |
| 2006/0264137 A1* | 11/2006 | Ishihara | ................... | D04B 1/24 442/317 |
| 2008/0231337 A1* | 9/2008 | Krishnaswamy | ...... | H03K 3/537 327/291 |
| 2013/0054199 A1* | 2/2013 | Wu | ........................ | G06T 17/05 703/1 |

(Continued)

OTHER PUBLICATIONS

Chaemartin, "Modeling and simulation of sparking in fastening assembles", pp. 1-14. (Year: 2013).*

(Continued)

*Primary Examiner* — Kevin L Young
*Assistant Examiner* — Phuong N Hoang
(74) *Attorney, Agent, or Firm* — Womble Bond Dickinson (US) LLP (57) ABSTRACT

An apparatus for conducting an engineering analysis of a structural product is provided. The apparatus produces a computer-aided design (CAD) model of the structural product including component parts joined by fasteners and produces a finite-difference time-domain (FDTD) model of the structural product from the CAD model. The apparatus assigns one or more electrical properties to a mesh of elements representing the component parts and fasteners, and performs a finite-difference time-domain analysis on the FDTD model with the one or more electrical properties assigned, and with the FDTD model exposed to simulated lightning, to predict an impact of lightning on the fasteners (Continued)

and therefrom generate a corresponding prediction. The apparatus produces an output based on the corresponding prediction that indicates one or more levels of the impact of lightning on the fasteners and displays the output to facilitate design or manufacture of the structural product.

21 Claims, 8 Drawing Sheets

(56) References Cited

U.S. PATENT DOCUMENTS

| | | | |
|---|---|---|---|
| 2013/0286187 A1* | 10/2013 | Slesinski | B25F 5/021 |
| | | | 353/121 |
| 2016/0364512 A1* | 12/2016 | Grip | G06F 30/23 |
| 2017/0070060 A1* | 3/2017 | Corum | H02J 50/00 |
| 2018/0186475 A1* | 7/2018 | Garville | H04N 13/388 |
| 2018/0372902 A1* | 12/2018 | Han | G01V 1/50 |

OTHER PUBLICATIONS

Capinc, "Fasteners In FEA Dynamics Simulation", pp. 1-10. (Year: 2016).*
Apra, "Prediction of Indirect Lighting Effect on a Metallic-Composite Aircraft", pp. 1-10. (Year: 2001).*
Apra, "Lightning Indirect Effects Certification of a Transport Aircraft by Numerical Simulation", pp. 513-523 (Year: 2008).*
Johns, "Simulating EM Shielding for Aeronautical Applications", pp. 1-14. (Year: 2017).*

* cited by examiner

ENGINEERING ANALYSIS OF A STRUCTURAL PRODUCT

TECHNOLOGICAL FIELD

The present disclosure relates generally to designing and manufacturing a structural product, and in particular, to engineering analysis of a structural product using a finite-difference time-domain model.

BACKGROUND

Engineering analysis of a structural product such as an aircraft is important for its design and manufacture. For example, engineering analysis of impact of lightning to an aircraft can facilitate its design or manufacture to account for the impact of lightning. Finite-difference time-domain (FDTD) analysis is a numerical engineering analysis technique used for modeling computational electrodynamics.

Performing a FDTD analysis of a structural product requires converting a geometric model such as a computer-aided design (CAD) model of the structural product to a FDTD model. A structural product such as an aircraft may include a large number of component parts joined by fasteners. To produce a FDTD model that accurately represents the structural product, one solution is to manually convert the geometric model including the large number of component parts and fasteners to the FDTD model. This is time-costing, labor-intensive and error-prone. Another solution is to represent in the FDTD model only those fasteners in areas of importance, and assume that other fasteners will not impact a given area in the FDTD analysis. This solution allows for FDTD analysis on a general joint made up of many fasteners, but does not allow for analysis at the fastener level. Another drawback of this solution is that any changes to the FDTD model must be applied to the individual fasteners, which is time-consuming and, thus, costly.

Therefore, it would be desirable to have a system and method that takes into account at least some of the issues discussed above, as well as other possible issues.

BRIEF SUMMARY

Example implementations of the present disclosure are directed to designing and manufacturing a structural product, and in particular, to engineering analysis of a structural product using a FDTD model. Example implementations can automate the process of converting a geometric model of the structural product, which includes a large number of component parts joined by fasteners, to the FDTD model. Also, example implementations can provide FDTD analysis of the impact of lightning to the structural product at the fastener level. Moreover, example implementations can provide identifiers of the fasteners in the geometric model, the FDTD model, and the output of the FDTD analysis, all of which are traceable to structural definitions of the fasteners.

Traceability to fastener definitions can allow for better modeling of the electrical parameters of fasteners since the electrical parameters may vary based on fastener type, installation method, and materials around the fastener. Associating specific fasteners with their threats can allow for specific protection mechanisms instead of applying a worst-case lightning protection to all fasteners of a general installation. Traceability to fastener definitions can be provided in a spreadsheet identifying all fasteners and their corresponding threats. During certification, the spreadsheet can provide a register of all fasteners, including sparking/performance thresholds, margins, and a list of fasteners that require protection. The structural definitions can be provided directly to the manufacturing installation guides, as understanding the electromagnetic environment (EME) may be useful if there is a problem during installation that requires analysis for disposition. Traceability to fastener definitions may also allow engineers to communicate clearly about lightning threats and track changes to fasteners during aircraft design.

The present disclosure thus includes, without limitation, the following example implementations.

Some example implementations provide a method for designing or manufacturing a structural product, the method comprising: producing a computer-aided design (CAD) model of a structural product including component parts joined by fasteners, the CAD model excluding structural definitions of the fasteners and including identifiers of the fasteners that are traceable to respective structural definitions of the fasteners; producing a finite-difference time-domain model of the structural product from the CAD model, the finite-difference time-domain model representing the component parts and fasteners by a mesh of elements, the finite-difference time-domain model including the identifiers of the fasteners; assigning one or more electrical properties to elements of the mesh of elements representing the component parts and fasteners, the one or more electrical properties describing an effect of electromagnetic radiation on the component parts and fasteners; performing a finite-difference time-domain analysis on the finite-difference time-domain model with the one or more electrical properties assigned, and with the finite-difference time-domain model exposed to simulated lightning, to predict an impact of lightning on the fasteners and therefrom generate a corresponding prediction; producing an output based on the corresponding prediction that indicates one or more levels of the impact of lightning on the fasteners, and that includes the identifiers of the fasteners; and designing or manufacturing the structural product based on the output.

In some example implementations of the method of any preceding example implementation, or any combination of preceding example implementations, the CAD model is a second CAD model of the structural product, and producing the CAD model includes producing the second CAD model based on a first CAD model of the structural product that includes the structural definitions of the fasteners.

In some example implementations of the method of any preceding example implementation, or any combination of preceding example implementations, producing the finite-difference time-domain model includes at least: determining intersections between the fasteners and surfaces of the component parts based on the CAD model; generating a mesh of multi-dimensional elements representing the component parts; and adding line segment elements representing the fasteners to the mesh of multi-dimensional elements based on the intersections, and thereby producing the mesh of elements of the finite-difference time-domain model.

In some example implementations of the method of any preceding example implementation, or any combination of preceding example implementations, the mesh of elements includes multi-dimensional elements and line segment elements representing respectively the component parts and the fasteners, and wherein assigning the one or more electrical properties to the elements includes assigning electrical conductivity values to the multi-dimensional elements, and assigning electrical resistance values to the line segment elements.

In some example implementations of the method of any preceding example implementation, or any combination of preceding example implementations, performing the finite-difference time-domain analysis includes performing the finite-difference time-domain analysis on the finite-difference time-domain model with the one or more electrical properties assigned, and with the finite-difference time-domain model exposed to simulated lightning in a plurality of scenarios, to predict the impact of lightning on the fasteners in the plurality of scenarios and therefrom generate corresponding predictions.

In some example implementations of the method of any preceding example implementation, or any combination of preceding example implementations, performing the finite-difference time-domain analysis includes performing the finite-difference time-domain analysis on the finite-difference time-domain model with the one or more electrical properties assigned, and with the finite-difference time-domain model exposed to simulated lightning in the plurality of scenarios in which different fasteners are exposed to different simulated lightning strikes at different points of time, and wherein producing the output includes aggregating the corresponding predictions to produce the output.

In some example implementations of the method of any preceding example implementation, or any combination of preceding example implementations, performing the finite-difference time-domain analysis includes performing the finite-difference time-domain analysis on the finite-difference time-domain model with the one or more electrical properties assigned, and with the finite-difference time-domain model exposed to simulated lightning, to predict a current flow through the fasteners exposed to lightning.

In some example implementations of the method of any preceding example implementation, or any combination of preceding example implementations, producing the output includes determining a protection level for the fasteners based on the one or more levels of the impact of lightning on the fasteners.

Some example implementations provide an apparatus for engineering analysis of a structural product. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for engineering analysis of a structural product. The computer-readable storage medium is non-transitory and has computer-readable program code stored therein that in response to execution by a processor, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE DRAWING(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to designing and manufacturing a structural product, and in particular, to engineering analysis of a structural product using a finite-difference time-domain model. The system is primarily described in the context of an aircraft, but it should be understood that the system is equally applicable to other types of structural products such as any of a number of different types of manned or unmanned land vehicles, aircraft, spacecraft, watercraft or the like.

Figure 1:
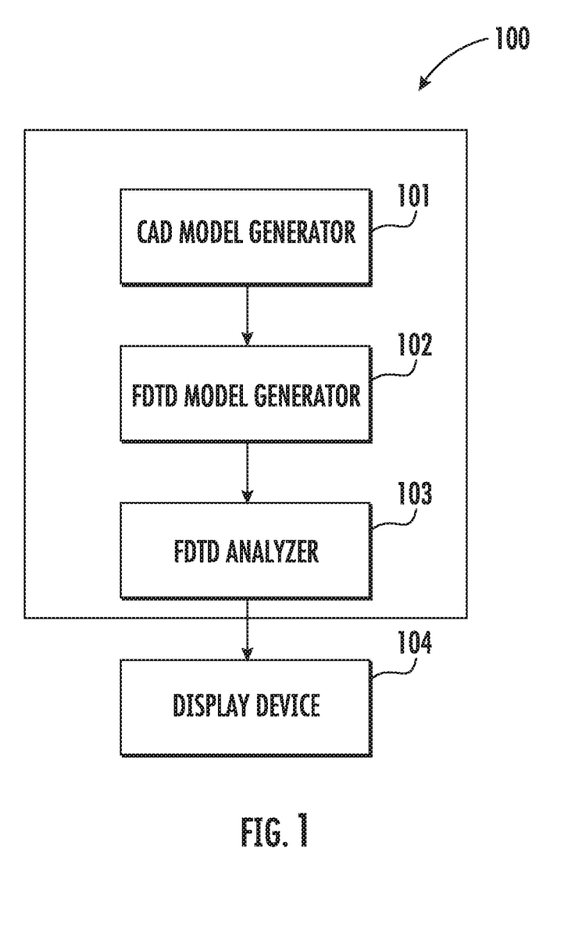
FIG. 1 illustrates a system for engineering analysis of a structural product, according to example implementations of the present disclosure.

FIG. 1 illustrates a system 100 for engineering analysis of a structural product, according to example implementations of the present disclosure. In some examples, as described in greater detail with reference to FIG. 8, the system may be implemented by an apparatus that includes a processor and a memory storing executable instructions that in response to execution by the processor, causes an apparatus to implement functionality of the system.

The system 100 includes any of a number of different subsystems (each an individual system) for performing one or more functions or operations. As shown, in some examples, the system includes one or more of each of a computer-aided design (CAD) model generator 101, a finite-difference time-domain (FDTD) model generator 102, a FDTD analyzer 103 and a display device 104. The CAD model generator, the FDTD model generator and the FDTD analyzer can be included in a subsystem of the system 100. The subsystems may be co-located or directly coupled to one another, or in some examples, various ones of the subsystems may communicate with one another across one or more computer networks. Further, although shown as part of the system, it should be understood that any one or more of the CAD model generator, FDTD model generator, FDTD analyzer or display device may function or operate as a separate system without regard to any of the other subsystems. It should also be understood that the system may include one or more additional or alternative subsystems than those shown in FIG. 1.

The CAD model generator 101 is configured to produce a CAD model of a structural product including component parts joined by fasteners. In some examples, the CAD model generator may be implemented in commercially-available software such as CATIA from Dassault Systèmes. The CAD model produced by the CAD model generator excludes structural definitions of the fasteners, and includes identifiers of the fasteners that are traceable to respective ones of the structural definitions of the fasteners. The structural definitions of the fasteners may include mechanical definitions of the fasteners, such as diameters of the fasteners. In one example, the identifier of a fastener is directly traceable to its structural definition, which establishes a one-to-one traceability or correspondence between the identifier and the structural definition. The identifiers of the fasteners may be part names or part numbers of the fasteners.

In some examples, the CAD model produced by the CAD model generator 101 is a second CAD model of the structural product. In these examples, the CAD model generator is configured to produce the second CAD model based on a first CAD model of the structural product that includes the structural definitions of the fasteners. The first CAD model may be a solid or a mechanical model stored in a database from which the CAD model generator may extract the first CAD model to produce the second CAD model.

In some examples, the FDTD model generator 102 is configured to produce a FDTD model of the structural product from the CAD model. The FDTD model represents the component parts and fasteners by a mesh of elements, and includes identifiers of the fasteners to provide direct traceability to the structural definitions of the fasteners. The identifiers included in the FDTD model may be the identifiers included in the CAD model.

To generate the mesh of elements, in some examples, the FDTD model generator 102 is configured to determine or calculate intersections between the fasteners and surfaces of the component parts based on the CAD model. The FDTD model generator is also configured to generate a mesh of multi-dimensional elements representing the component parts. The FDTD model generator is further configured to add line segment elements representing the fasteners to the mesh of multi-dimensional elements based on the intersections, and to thereby produce the mesh of elements of the FDTD model. The component parts may include surfaces of the structural product, and the multi-dimensional elements may be two-dimensional (2D) elements representing the surfaces. The multi-dimensional elements may be voxels or cells used for FDTD analysis. The line segment elements may be one-dimensional (1D) line segments representing the fasteners. In one example, each element of the mesh of elements includes respective element datasets including values describing properties or statuses of the corresponding element.

To enable FDTD analysis of an impact of lightning to the structural product at the fastener level, the FDTD model generator 102 is configured to assign one or more electrical properties to elements of the mesh of elements representing the component parts and fasteners. This may be accomplished by the addition of the one or more electrical properties to respective element datasets of the elements representing the component parts and fasteners. The one or more electrical properties describe an effect of electromagnetic radiation on the component parts and fasteners. As suggested above, in some examples, the mesh of elements includes multi-dimensional elements and line segment elements representing respectively the component parts and the fasteners. In these examples, FDTD model generator is configured to assign electrical conductivity values to the multi-dimensional elements, and assign electrical resistance values to the line segment elements. More specifically, the FDTD model generator may assign the electrical conductivity values to the entire multi-dimensional elements and may assign electrical resistance values to endpoints or the middle of the line segment elements.

The FDTD analyzer 103 is configured to perform a FDTD analysis on the FDTD model with the one or more electrical properties assigned, and with the FDTD model exposed to simulated lightning, such as by solving differential equations to find approximate solutions to the FDTD model when exposed to simulated lightning. The FDTD analysis is performed to predict an impact of lightning on the fasteners and therefrom generate a corresponding prediction. In one example, the FDTD analysis is performed to predict a current flow through the fasteners exposed to lightning, and this predicted current may indicate the severity or level of the impact of lightning on the fasteners.

To accurately predict the impact of lightning on the fasteners, in some examples, the FDTD analyzer 103 is configured to perform the FDTD analysis for a plurality of scenarios to predict the impact of lightning on the fasteners in the plurality of scenarios and therefrom generate corresponding predictions. In these examples, the FDTD analyzer is configured to perform the FDTD analysis for the plurality of scenarios in which different fasteners are exposed to multiple different simulated lightning strikes at different points of time. The same FDTD model can be used for performing the FDTD analysis in the plurality of scenarios.

In some examples, the FDTD analyzer 103 is configured to produce an output based on the corresponding prediction that indicates one or more levels of the impact of lightning on the fasteners. The output also includes identifiers of the fasteners to provide direct traceability to the structural definition of the fasteners. The identifiers included in the output may be the same as the identifiers included in the CAD model and FDTD model. In some examples, the FDTD analyzer is configured to aggregate the corresponding predictions in the plurality of scenarios to produce the output. In these examples, the FDTD analyzer can include all the information indicating the one or more levels of the impact of lightning on the fasteners in the plurality of scenarios in the output. In one example, the FDTD model generator 102 and the FDTD analyzer may be implemented in commercially-available software such as Patran from MSC Software Corporation.

The output of the FDTD analysis is provided to the display device 104, which is configured to display the output to facilitate design or manufacture of the structural product. In this regard, engineers can design or manufacture the structural product based on the output to account for the impact of lightning on the fasteners. In some examples, the FDTD analyzer 103 is configured to determine a protection level for the fasteners based on the one or more levels of the impact of lightning on the fasteners. The protection level can be included in the output for display to the engineers. The engineers can design or manufacture the structural product by utilizing the protection level for the fasteners, e.g., by adding an extra protection layer to the fasteners to account for the impact of lightning on the fasteners.

Figure 2:
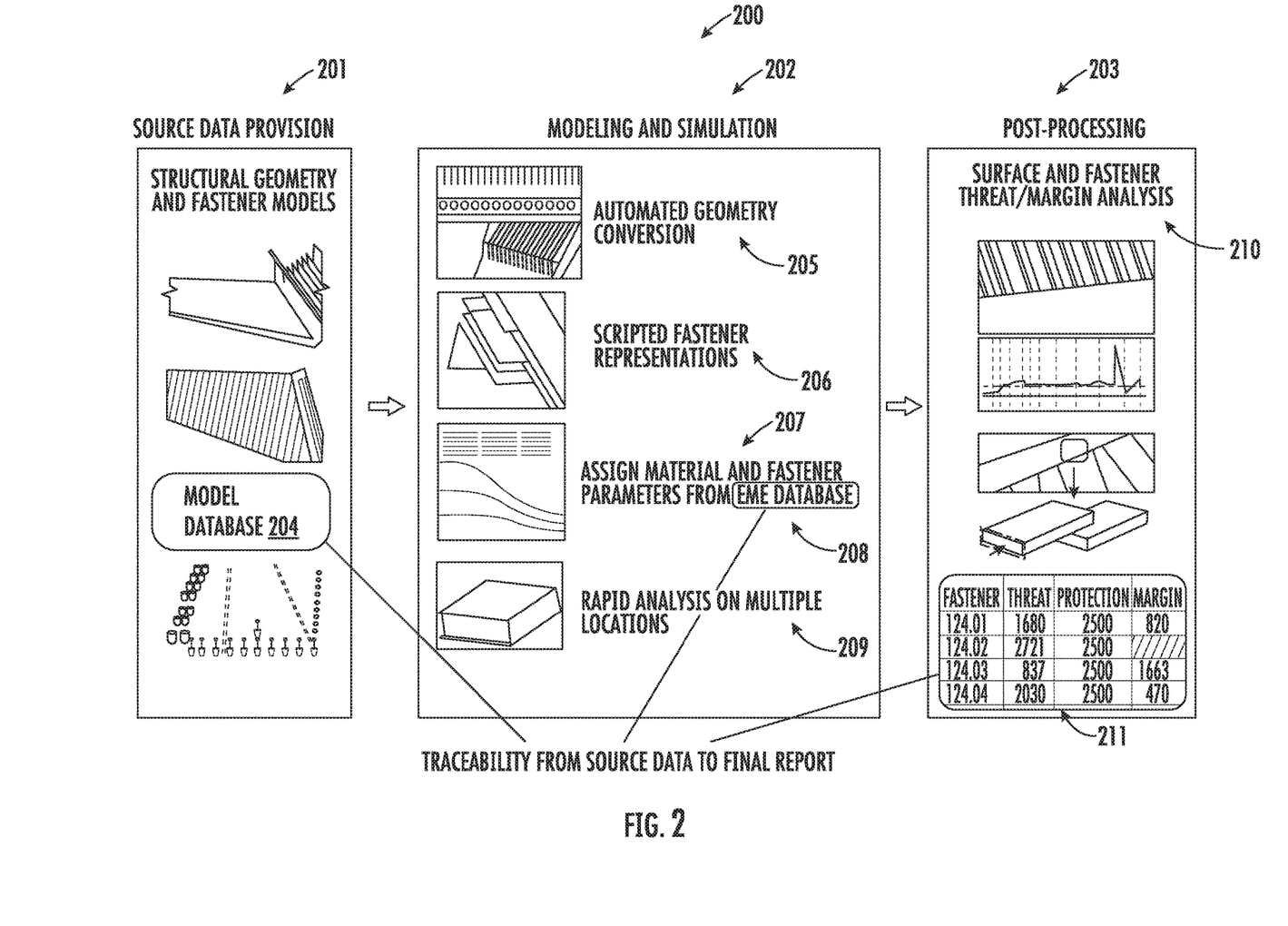
FIG. 2 illustrates a process for performing engineering analysis of a structural product, according to one example implementation.

FIG. 2 illustrates a process of performing engineering analysis of a structural product, according to one example implementation. As shown, the process 200 includes source data provision 201, modeling and simulation 202 and post-processing 203. The source data may include structural geometry and fastener CAD models of the structural product as shown. In one embodiment, the source data may include a model database 204. The model database may include the first CAD model of the structural product that includes the structural definitions of the fasteners, as explained above.

The modeling and simulation 202 may be performed by the CAD model generator 101, the FDTD model generator 102 and the FDTD analyzer 103 based on the source data. In one example, the CAD model generator is configured to perform automated geometry conversion 205, and generate scripted fastener representations 206 to produce the second CAD model of the structural product as explained above. The second CAD model of the structural product may include the identifiers of the fasteners that are traceable to respective ones of the structural definitions of the fasteners stored in the model database 204.

In one example, the FDTD model generator 102 is configured to produce the FDTD model of the structural product from the second CAD model and assign material and fastener parameters 207 from an electromagnetic environment (EME) database 208. The parameters may include the one or more electrical properties as explained above. In one example, the EME database may include the identifiers of the fasteners that are traceable to respective ones of the structural definitions of the fasteners stored in the model database 204. In one example, the FDTD analyzer 103 is configured to perform rapid FDTD analysis on multiple scenarios or locations in which different fasteners are exposed to multiple different simulated lightning strikes at different points of time 209.

Post-processing 203 may be performed by the FDTD analyzer 103 and the display device 104. In one example, the FDTD analyzer is configured to perform a FDTD analysis, such as a surface and fastener threat/margin analysis 210, to predict an impact of lightning on the fasteners and therefrom generate a corresponding prediction as explained above. The display device may display a final report 211 including an output that indicates one or more levels of the impact of lightning on the fasteners and the corresponding protection levels for the fasteners. Engineers can design or manufacture the structural product based on the final report to account for the impact of lightning on the fasteners as explained above. In one example, the final report also includes the identifiers of the fasteners that are traceable to respective ones of the structural definitions of the fasteners stored in the model database 204.

Figure 3:
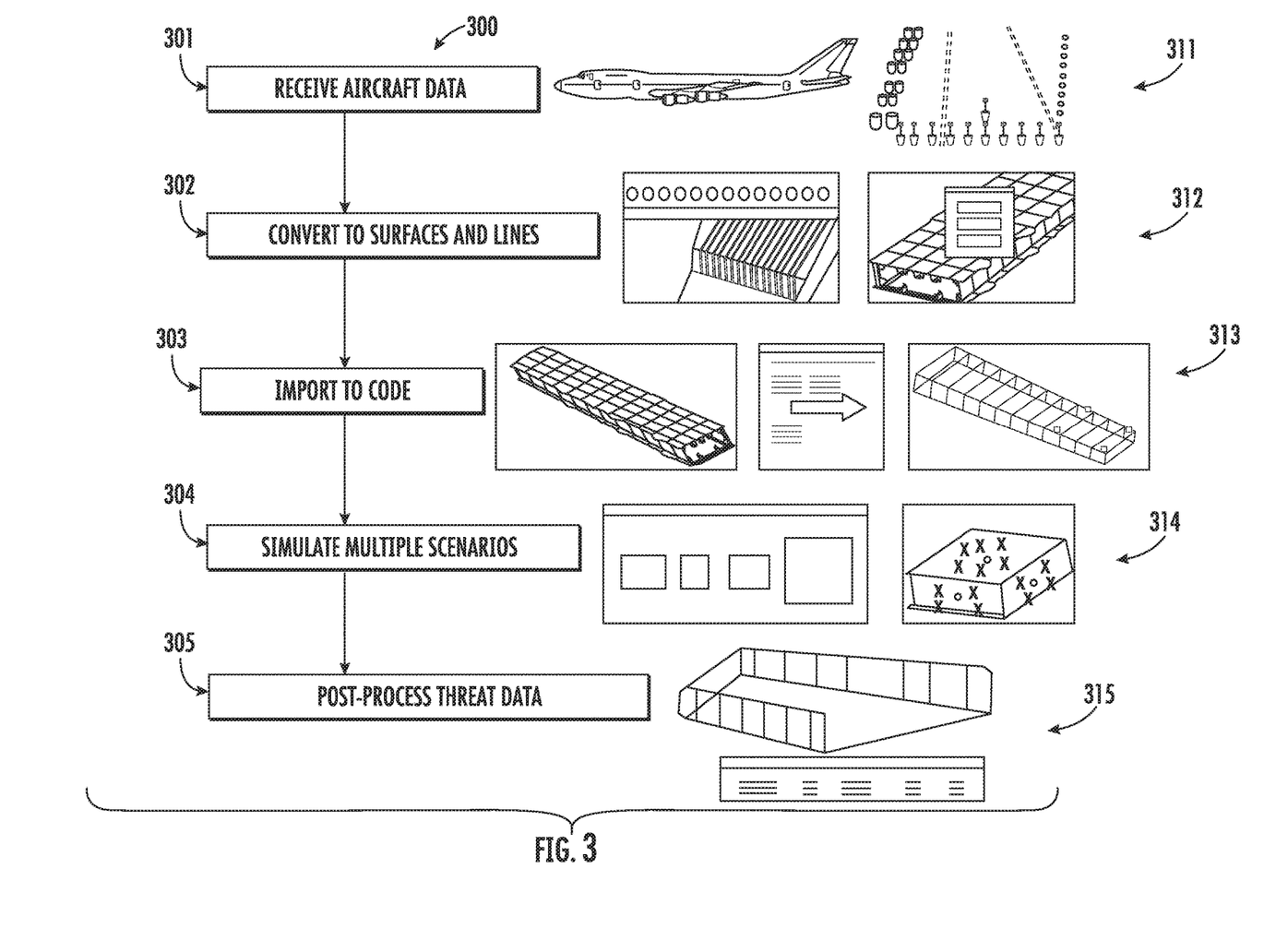
FIG. 3 illustrates a process for performing engineering analysis of a structural product, according to another example implementation.

FIG. 3 illustrates a process 300 of performing engineering analysis of a structural product, according to another example implementation. As shown, at block 301, the CAD model generator 101 is configured to receive aircraft data. As explained above, the aircraft data may include a first CAD model of the structural product that includes the structural definitions of the fasteners as shown in the illustration 311. The first CAD model may be a solid or a mechanical model stored in a database.

At block 302, the CAD model generator 101 is configured to covert the first CAD model to surfaces and lines to produce the second CAD model. As explained above, the CAD model generator can be configured to perform automated geometry conversion, and generate scripted fastener representations to produce the second CAD model, as shown in the illustration 312. The second CAD model may include component parts joined by fasteners and identifiers of the fasteners that are traceable to respective structural definitions of the fasteners. At block 303, the FDTD model generator 102 is configured to import the second CAD model to FDTD code to produce a FDTD model of the structural product. The FDTD model can represent the component parts and fasteners by a mesh of elements, as shown in the illustration 313. The FDTD model may include the identifiers of the fasteners that are traceable to respective structural definitions of the fasteners. At block 304, the FDTD analyzer 103 is configured to simulate lightning strikes in a plurality of scenarios to predict an impact of lightning on the fasteners of the structural product and therefrom generate a corresponding prediction. Lightning strikes may have different impacts to different fasteners, as shown by different marks in the illustration 314 and as explained in details below. At block 305, the FDTD analyzer and the display device 104 are configured to post-process the threat data. For example, the FDTD analyzer can be configured to produce an output based on the corresponding prediction that indicates one or more levels of the impact of lightning on the fasteners. The display device can be configured to display the output to facilitate design or manufacture of the structural product.

In one example, the process of producing the CAD model and the FDTD model exhibits itself in the form of a software tool written using metaprogramming techniques, and in which the CAD model generator 101, FDTD model generator 102 and FDTD analyzer 103 are implemented in respectively CATIA and Patran. The software tool, or metaprogram, scans through a model tree of an aircraft section model in CATIA and writes code in an object language to generate the FDTD model in Patran via generative programming. The metaprogram then interacts with Patran and runs an object program in Patran that rebuilds the FDTD model piece-by-piece. The metaprogram also interacts with a database of materials that is traceable to the data origins, such as test or model data. The metaprogram uses data from this database of materials and writes instructions in the object program to assign material properties, thicknesses, and other parameters as specified. Further, the metaprogram creates instructions in the object program to assign probes that monitor electrical current and other values, such as voltage. Finally, the metaprogram creates instructions in the object program to build fasteners with properties, locations, and identification numbers that are traceable back to the original aircraft design database.

Figure 4:
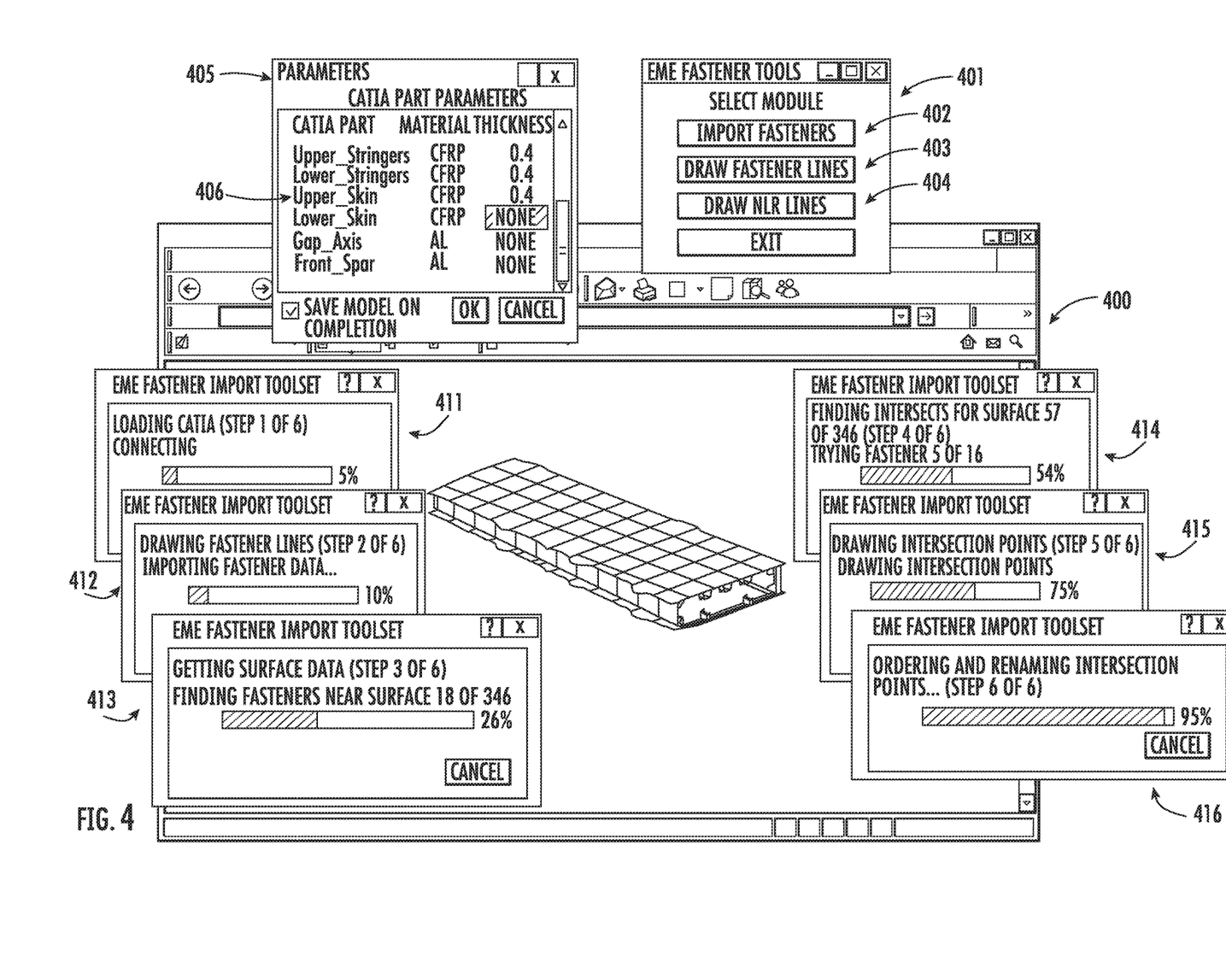
FIG. 4 illustrates a graphical user interface (GUI) including windows that may be presented during production of a CAD model of a structural product, according to various example implementations.

FIG. 4 illustrates a graphical user interface (GUI) 400 including windows that may be presented during production of the second CAD model of the structural product, according to various example implementations. In one example, the GUI may correspond to the illustration 312 in FIG. 3. As shown, the GUI includes windows that identify and show the progression of operations in the automated process of producing the second CAD model of the structural product. The GUI may include a window 401 in which to enable user selection of one or more modules for producing the CAD model for FDTD modeling or EME modeling. The window may enable selection of modules for generating the second CAD model, such as a graphical element 402 to select a module for importing fasteners, a graphical element 403 to select a module for drawing fastener lines, and a graphical element 404 to select a module for drawing narrow line region (NLR) lines.

The GUI 400 may also include user options for high-fidelity at whole component parts, selected regions of the structural product, or selected fasteners. In another example, the GUI may also include part parameters for producing the CAD model, as shown in window 405. The window may include part names such as "Upper Skin" 406. The window may also include materials of the component parts such as carbon fiber reinforced polymer (CFRP) and aluminum (AL), and thickness of the component parts such as 0.4 inches. The produced CAD model may include identifiers of the fasteners that are traceable to respective ones of the structural definitions of the fasteners. For example, each part name of a fastener may correspond to a respective structural definition of the fastener.

The GUI 400 may also include windows with information indicating various operations or steps performed by selected ones of the modules, including windows 411-416 for the module selected by the graphical element 402 to import fasteners. Windows 411-416 may be implemented in CATIA using Python wrappers which automate CATIA actions. As shown in windows 411 and 412 of the GUI, the module loads CATIA, and imports fastener data. The fastener data may be stored in a database and may include the first CAD model including the structural definitions of the fasteners as explained above. As shown in windows 413 and 414, the module finds fasteners near surfaces of the first CAD model, and finds or calculates intersections between the fasteners and surfaces of the component parts. As shown in windows 415 and 416, the module draws fastener intersection points such as fastener shafts and radial lines for detailed representations, and orders and renames the intersection points for FDTD modeling purposes. The module selected by the graphical element 402 can maintain data of structural design of the fasteners in the intersection definitions. The actual fastener shafts and radial lines can be created in graphical elements 403 and 404 with names of the fasteners traceable to the structural design of the fasteners.

Figure 5:
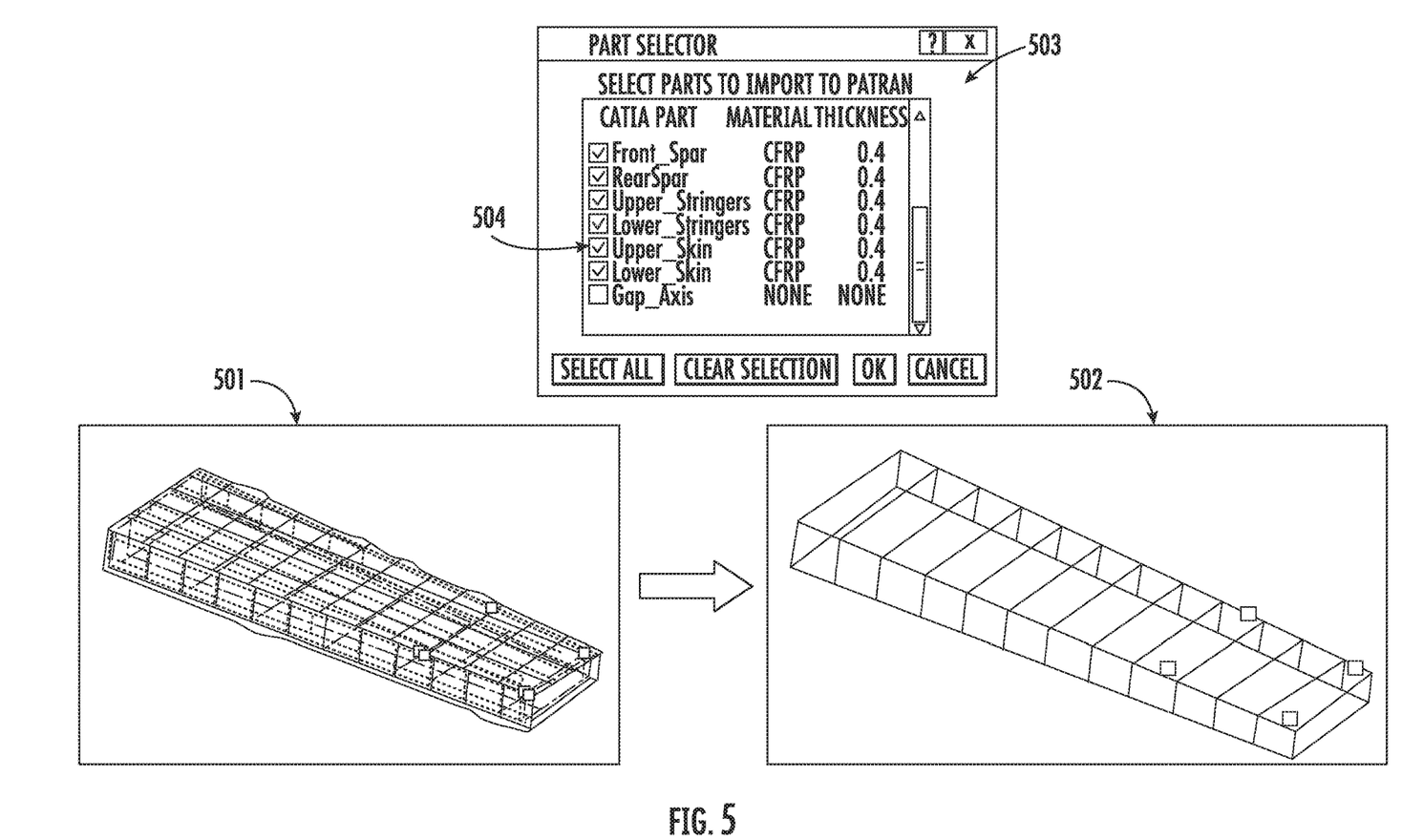
FIG. 5 illustrates a GUI that may be presented during production of a FDTD model of the structural product from the CAD model, according to various example implementations.

FIG. 5 illustrates a GUI that may be presented during production of a FDTD model of the structural product from the CAD model, according to various example implementations. In one example, the GUI in FIG. 5 may correspond to the illustration 313 in FIG. 3. The FDTD model may be an EME model. The process may be performed automatically to create a parameterized EME model in Patran. As shown, the CAD model 501 of the structural product, which may be produced according to the automated process described in FIG. 4, can be automatically converted to produce a FDTD model 502 in Patran. In some examples, a GUI 503 or window of a GUI may allow a user to select which component parts of the structural product (e.g., "Upper Skin" 504) to import to Patran for the conversion. In one example, as shown, the FDTD model may represent the component parts and fasteners of the structural product by a mesh of elements. In some examples, the process can auto-deletes phantom surfaces and fasteners created during Patran import.

In one example, the FDTD model generator 102 is configured to assign one or more electrical properties to elements of the mesh of elements representing the component parts and fasteners. The one or more electrical properties describe an effect of electromagnetic radiation on the component parts and fasteners. The FDTD model can maintain one-to-one traceability from structural models to the FDTD model. For example, each part name of a fastener may correspond to a respective structural definition of the fastener.

As explained above, the FDTD analyzer 103 can be configured to perform a FDTD analysis on the FDTD model produced in FIG. 5 with the one or more electrical properties assigned, and the FDTD model exposed to simulated lightning, to predict an impact of lightning on the fasteners and therefrom generate a corresponding prediction. The FDTD analyzer can be further configured to produce an output based on the corresponding prediction that indicates one or more levels of the impact of lightning on the fasteners, and that includes the identifiers of the fasteners that are traceable to respective ones of the structural definitions of the fasteners. The display device 104 can be configured to display the output to facilitate design or manufacture of the structural product.

Figure 6:
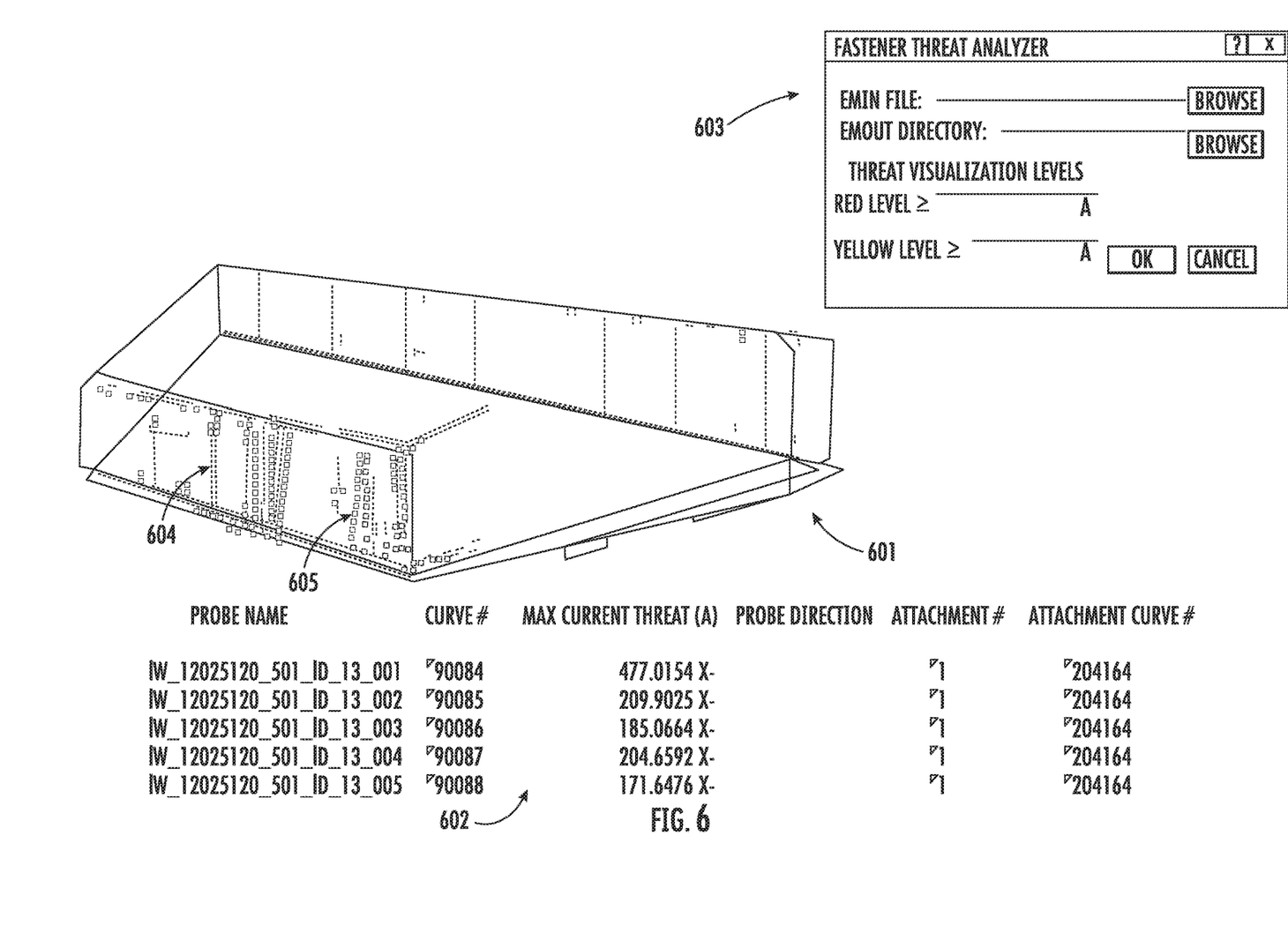
FIG. 6 illustrates an output that indicates one or more levels of the impact of lightning on the fasteners of the structural product, and that may be produced from a FDTD analysis, according to various example implementations.

FIG. 6 illustrates an output that indicates one or more levels of the impact of lightning on the fasteners of the structural product, and that may be produced from a FDTD analysis, according to various example implementations. In one example, the output in FIG. 6 may correspond to the illustration 315 in FIG. 3. As shown, output can include a visual model 601 indicating one or more levels of the impact of lightning on the fasteners of the structural product. Different levels of the impact of lightning on the fasteners can be shown by different marks or colors as indicated in the visual model. In one example, the impact of lightning may be indicated by current flow through the fasteners exposed to lightning. For example, as shown in the visual model 601, the dotted lines 604 may indicate that the current flow through the fasteners located along the dotted lines are below a safety threshold thus no additional protection levels may be needed for the fasteners located along the dotted lines. The blocks 605 may indicate that the current flow through the fasteners located along the blocks are above a safety threshold such that additional protection levels may be provided to those fasteners located along the blocks.

The output may also include a table 602 indicating one or more levels of the impact of lightning on the fasteners of the structural product. In one example, the output may reduce multiple-segment fastener threats to a single value. In this example, the FDTD analyzer 103 can be configured to predict a current flow through the fasteners exposed to lightning in a plurality of scenarios in which different fasteners are exposed to different simulated lightning strikes at different points of time. As shown in the table 602, the simulations may set simulated sensors or probes as indicated by "PROBE NAME" to capture the current flow through the fasteners exposed to lightning in the simulations. Each name of the probes may correspond to the original model-based geometric definition of the aircraft. The predicted maximum current threat may indicate the highest value of current that a probe detects throughout the simulation for any individual fastener. The predicted maximum current threat can be used to determine whether the fastener is susceptible to sparking risks by comparison to laboratory test data. The simulations can simulate lightning strikes to multiple locations and simulate lightning exit paths to different ends of the aircraft (e.g., nose, tail and opposite wings). Attachment number (ATTACHMENT #) may be different for each fastener and may correspond to the simulated location and simulated exit path that create the highest maximum current threat for a particular fastener. The Curve # and Attachment Curve # may correspond to a unique identifier for the geometric representation of the fastener line geometry or the attachment line geometry within the EME model.

In one example, the table can aggregate the predictions to produce the output. For example, the table can aggregate the predictions by aggregating the predicted maximum current threat for each fastener in a plurality of scenarios. Engineers can design or manufacture the structural product based on the output to account for the impact of lightning on the fasteners. For example, engineers can design or manufacture the structural product considering the highest value of the maximum current threat in the plurality of scenarios.

In another example, the user can configure the simulated scenarios and build multiple scenarios and grounds into a single FDTD model. For example, the user can simulate twenty lightning strikes to predict the impact of lightning on the fasteners using a single FDTD model. The user can also select combinations to build the scenarios using a scenario configuration file. A GUI 603 can import the scenario configuration file and store the output in a directory. The GUI can also visualize and display the threat levels using different marks or colors. Also, the output may associate the maximum current threat to the corresponding scenario configuration file.

Figure 7:
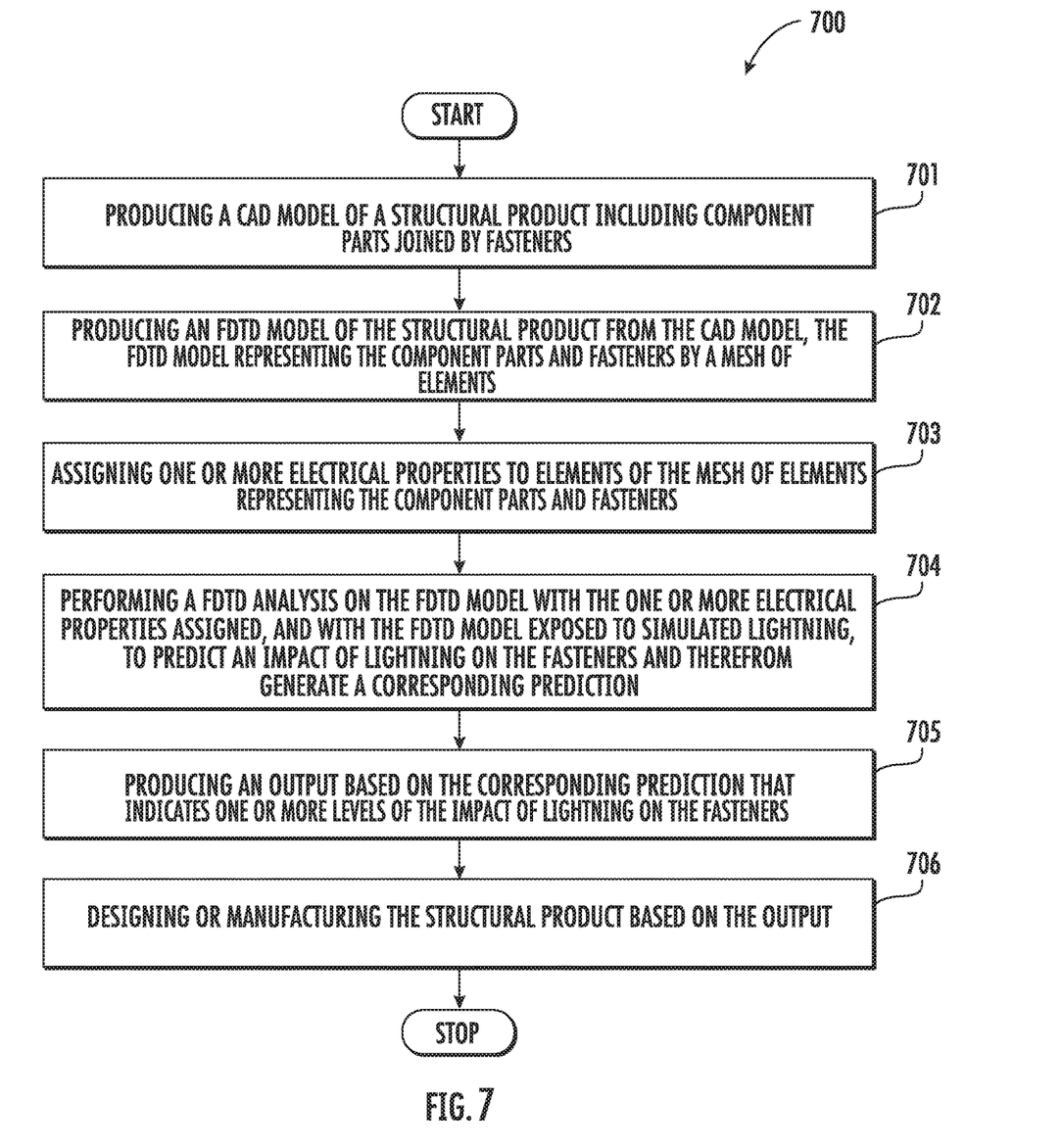
FIG. 7 is a flowchart illustrating various operations in a method for designing or manufacturing a structural product, according to various example implementations.

FIG. 7 is a flowchart illustrating various operations in a method 700 of designing or manufacturing a structural product, according to various example implementations. As shown, at block 701, the method includes producing a CAD model of a structural product including component parts joined by fasteners. The CAD model excludes structural definitions of the fasteners, and includes identifiers of the fasteners that are traceable to respective ones of the structural definitions of the fasteners.

At block 702, the method 700 includes producing a FDTD model of the structural product from the CAD model. The FDTD model represents the component parts and fasteners by a mesh of elements. The FDTD model also includes the identifiers of the fasteners. At block 703, the method includes assigning one or more electrical properties to elements of the mesh of elements representing the component parts and fasteners. The one or more electrical properties describe an effect of electromagnetic radiation on the component parts and fasteners.

At block 704, the method 700 includes performing a FDTD analysis on the FDTD model with the one or more electrical properties assigned, and with the FDTD model exposed to simulated lightning, to predict an impact of lightning on the fasteners and therefrom generate a corresponding prediction. At block 705, the method includes producing an output based on the corresponding prediction that indicates one or more levels of the impact of lightning on the fasteners, and that includes the identifiers of the fasteners. At block 706, the method includes designing or manufacturing the structural product based on the output.

According to example implementations of the present disclosure, the system 100 and its subsystems including the CAD model generator 101, FDTD model generator 102, FDTD analyzer 103 and display device 104 may be implemented by various means. Means for implementing the system and its subsystems may include hardware, alone or under direction of one or more computer programs from a computer-readable storage medium. In some examples, one or more apparatuses may be configured to function as, or otherwise implement, the system and its subsystems shown and described herein. In examples involving more than one apparatus, the respective apparatuses may be connected to, or otherwise be in communication with, one another in a number of different manners, such as directly or indirectly via a wired or wireless network or the like.

Figure 8:
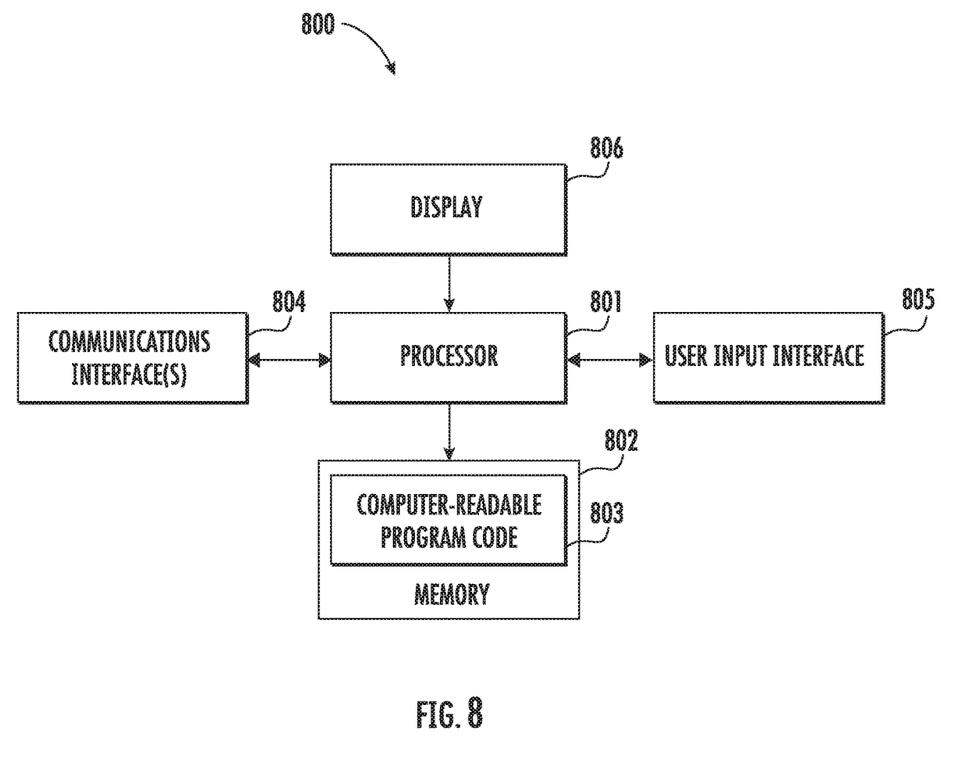
FIG. 8 illustrates an apparatus according to some example implementations.

FIG. 8 illustrates an apparatus 800 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 801 (e.g., processing circuitry) connected to a memory 802 (e.g., storage device). In some examples, the apparatus 800 implements the system 100.

The processor 801 may be comprised of one or more processors alone or in combination with one or more memories. The processor is generally any piece of computer hardware that is capable of processing information such as, for example, data, computer programs and/or other suitable electronic information. The processor is comprised of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 802 (of the same or another apparatus).

The processor 801 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 802 is generally any piece of computer hardware that is capable of storing information such as, for example, data, computer programs (e.g., computer-readable program code 803) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 802, the processor 801 may also be connected to one or more interfaces for displaying, transmitting and/or receiving information. The interfaces may include a communications interface 804 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 806 and/or one or more user input interfaces 805 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like. In some examples, the user interfaces include the GUI 106.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 800 may include a processor 801 and a computer-readable storage medium or memory 802 coupled to the processor, where the processor is configured to execute computer-readable program code 803 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for engineering analysis of a structural product, the apparatus comprising a processor and a memory storing executable instructions that, in response to execution by the processor, cause the apparatus to at least:

produce a computer-aided design (CAD) model of a structural product including component parts joined by fasteners, the CAD model excluding structural definitions of the fasteners, and including identifiers of the fasteners that are traceable to respective structural definitions of the fasteners;

produce a finite-difference time-domain model of the structural product from the CAD model, the finite-difference time-domain model representing the component parts and fasteners by a mesh of elements, the finite-difference time-domain model including the identifiers of the fasteners;

assign one or more electrical properties to elements of the mesh of elements representing the component parts and fasteners, the one or more electrical properties describing an effect of electromagnetic radiation on the component parts and fasteners;

perform a finite-difference time-domain analysis on the finite-difference time-domain model with the one or more electrical properties assigned, and with the finite-difference time-domain model exposed to simulated lightning, to predict an impact of lightning on the fasteners and therefrom generate a corresponding prediction;

produce an output based on the corresponding prediction that indicates one or more levels of the impact of lightning on the fasteners, and that includes the identifiers of the fasteners; and display the output to facilitate design or manufacture of the structural product;

wherein the apparatus being caused to perform the finite-difference time-domain analysis includes being caused to perform the finite-difference time-domain analysis on the finite-difference time-domain model with the one or more electrical properties assigned, and with the finite-difference time-domain model exposed to simulated lightning in the plurality of scenarios in which different fasteners are exposed to different simulated lightning strikes at different points of time, and wherein the apparatus being caused to produce the output includes being caused to aggregate the corresponding predictions to produce the output.

2. The apparatus of claim 1, wherein the CAD model is a second CAD model of the structural product, and the apparatus being caused to produce the CAD model includes being caused to produce the second CAD model based on a first CAD model of the structural product that includes the structural definitions of the fasteners.

3. The apparatus of claim 1, wherein the apparatus being caused to produce the finite-difference time-domain model includes being caused to at least:

determine intersections between the fasteners and surfaces of the component parts based on the CAD model;

generate a mesh of multi-dimensional elements representing the component parts; and add line segment elements representing the fasteners to the mesh of multi-dimensional elements based on the intersections, to thereby produce the mesh of elements of the finite-difference time-domain model.

4. The apparatus of claim 1, wherein the mesh of elements includes multi-dimensional elements and line segment elements representing respectively the component parts and the fasteners, and wherein the apparatus being caused to assign the one or more electrical properties to the elements includes being caused to assign electrical conductivity values to the multi-dimensional elements, and assign electrical resistance values to the line segment elements.

5. The apparatus of claim 1, wherein the apparatus being caused to perform the finite-difference time-domain analysis includes being caused to perform the finite-difference time-domain analysis on the finite-difference time-domain model with the one or more electrical properties assigned, and with the finite-difference time-domain model exposed to simulated lightning in a plurality of scenarios, to predict the impact of lightning on the fasteners in the plurality of scenarios and therefrom generate corresponding predictions.

6. The apparatus of claim 1, wherein the apparatus being caused to perform the finite-difference time-domain analysis includes being caused to perform the finite-difference time-domain analysis on the finite-difference time-domain model with the one or more electrical properties assigned, and with the finite-difference time-domain model exposed to simulated lightning, to predict a current flow through the fasteners exposed to lightning.

7. The apparatus of claim 1, wherein the apparatus being caused to produce the output includes being caused to determine a protection level for the fasteners based on the one or more levels of the impact of lightning on the fasteners.

8. A method of designing or manufacturing a structural product, the method comprising:

producing a computer-aided design (CAD) model of a structural product including component parts joined by fasteners, the CAD model excluding structural definitions of the fasteners, and including identifiers of the fasteners that are traceable to respective structural definitions of the fasteners;

producing a finite-difference time-domain model of the structural product from the CAD model, the finite-difference time-domain model representing the component parts and fasteners by a mesh of elements, the finite-difference time-domain model including the identifiers of the fasteners;

assigning one or more electrical properties to elements of the mesh of elements representing the component parts and fasteners, the one or more electrical properties describing an effect of electromagnetic radiation on the component parts and fasteners;

performing a finite-difference time-domain analysis on the finite-difference time-domain model with the one or more electrical properties assigned, and with the finite-difference time-domain model exposed to simulated lightning, to predict an impact of lightning on the fasteners and therefrom generate a corresponding prediction;

producing an output based on the corresponding prediction that indicates one or more levels of the impact of lightning on the fasteners, and that includes the identifiers of the fasteners; and designing or manufacturing the structural product based on the output;

wherein performing the finite-difference time-domain analysis includes performing the finite-difference time-domain analysis on the finite-difference time-domain model with the one or more electrical properties assigned, and with the finite-difference time-domain model exposed to simulated lightning in the plurality of scenarios in which different fasteners are exposed to different simulated lightning strikes at different points of time, and wherein producing the output includes aggregating the corresponding predictions to produce the output.

9. The method of claim 8, wherein the CAD model is a second CAD model of the structural product, and producing the CAD model includes producing the second CAD model based on a first CAD model of the structural product that includes the structural definitions of the fasteners.

10. The method of claim 8, wherein producing the finite-difference time-domain model includes at least:
determining intersections between the fasteners and surfaces of the component parts based on the CAD model;
generating a mesh of multi-dimensional elements representing the component parts; and
adding line segment elements representing the fasteners to the mesh of multi-dimensional elements based on the intersections, and thereby producing the mesh of elements of the finite-difference time-domain model.

11. The method of claim 8, wherein the mesh of elements includes multi-dimensional elements and line segment elements representing respectively the component parts and the fasteners, and wherein assigning the one or more electrical properties to the elements includes assigning electrical conductivity values to the multi-dimensional elements, and assigning electrical resistance values to the line segment elements.

12. The method of claim 8, wherein performing the finite-difference time-domain analysis includes performing the finite-difference time-domain analysis on the finite-difference time-domain model with the one or more electrical properties assigned, and with the finite-difference time-domain model exposed to simulated lightning in a plurality of scenarios, to predict the impact of lightning on the fasteners in the plurality of scenarios and therefrom generate corresponding predictions.

13. The method of claim 8, wherein performing the finite-difference time-domain analysis includes performing the finite-difference time-domain analysis on the finite-difference time-domain model with the one or more electrical properties assigned, and with the finite-difference time-domain model exposed to simulated lightning, to predict a current flow through the fasteners exposed to lightning.

14. The method of claim 8, wherein producing the output includes determining a protection level for the fasteners based on the one or more levels of the impact of lightning on the fasteners.

15. A computer-readable storage medium for engineering analysis of a structural product, the computer-readable storage medium being non-transitory and having computer-readable program code stored therein that in response to execution by a processor, causes an apparatus to at least:
produce a computer-aided design (CAD) model of a structural product including component parts joined by fasteners, the CAD model excluding structural definitions of the fasteners, and including identifiers of the fasteners that are traceable to respective structural definitions of the fasteners;
produce a finite-difference time-domain model of the structural product from the CAD model, the finite-difference time-domain model representing the component parts and fasteners by a mesh of elements, the finite-difference time-domain model including the identifiers of the fasteners;
assign one or more electrical properties to elements of the mesh of elements representing the component parts and fasteners, the one or more electrical properties describing an effect of electromagnetic radiation on the component parts and fasteners;
perform a finite-difference time-domain analysis on the finite-difference time-domain model with the one or more electrical properties assigned, and with the finite-difference time-domain model exposed to simulated lightning, to predict an impact of lightning on the fasteners and therefrom generate a corresponding prediction;
produce an output based on the corresponding prediction that indicates one or more levels of the impact of lightning on the fasteners, and that includes the identifiers of the fasteners; and
display the output to facilitate design or manufacture of the structural product;
wherein the apparatus being caused to perform the finite-difference time-domain analysis includes being caused to perform the finite-difference time-domain analysis on the finite-difference time-domain model with the one or more electrical properties assigned, and with the finite-difference time-domain model exposed to simulated lightning in the plurality of scenarios in which different fasteners are exposed to different simulated lightning strikes at different points of time, and
wherein the apparatus being caused to produce the output includes being caused to aggregate the corresponding predictions to produce the output.

16. The computer-readable storage medium of claim 15, wherein the CAD model is a second CAD model of the structural product, and the apparatus being caused to produce the CAD model includes being caused to produce the second CAD model based on a first CAD model of the structural product that includes the structural definitions of the fasteners.

17. The computer-readable storage medium of claim 15, wherein the apparatus being caused to produce the finite-difference time-domain model includes being caused to at least:
determine intersections between the fasteners and surfaces of the component parts based on the CAD model;
generate a mesh of multi-dimensional elements representing the component parts; and
add line segment elements representing the fasteners to the mesh of multi-dimensional elements based on the intersections, to thereby produce the mesh of elements of the finite-difference time-domain model.

18. The computer-readable storage medium of claim 15, wherein the mesh of elements includes multi-dimensional elements and line segment elements representing respectively the component parts and the fasteners, and wherein the apparatus being caused to assign the one or more electrical properties to the elements includes being caused to assign electrical conductivity values to the multi-dimensional elements, and assign electrical resistance values to the line segment elements.

19. The computer-readable storage medium of claim 15, wherein the apparatus being caused to perform the finite-difference time-domain analysis includes being caused to perform the finite-difference time-domain analysis on the finite-difference time-domain model with the one or more electrical properties assigned, and with the finite-difference time-domain model exposed to simulated lightning in a plurality of scenarios, to predict the impact of lightning on the fasteners in the plurality of scenarios and therefrom generate corresponding predictions.

20. The computer-readable storage medium of claim 15, wherein the apparatus being caused to perform the finite-difference time-domain analysis includes being caused to perform the finite-difference time-domain analysis on the finite-difference time-domain model with the one or more electrical properties assigned, and with the finite-difference time-domain model exposed to simulated lightning, to predict a current flow through the fasteners exposed to lightning.

21. The computer-readable storage medium of claim 15, wherein the apparatus being caused to produce the output includes being caused to determine a protection level for the fasteners based on the one or more levels of the impact of lightning on the fasteners.

\* \* \* \* \*